(12) United States Patent
Czech et al.

(10) Patent No.: US 8,651,429 B2
(45) Date of Patent: Feb. 18, 2014

(54) BLENDED CUTOUT FLAP FOR REDUCTION OF JET-FLAP INTERACTION NOISE

(75) Inventors: Michael J Czech, Issaquah, WA (US); Russell H. Thomas, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/214,453

(22) Filed: Aug. 22, 2011

(65) Prior Publication Data
US 2012/0061525 A1 Mar. 15, 2012

Related U.S. Application Data

(60) Provisional application No. 61/375,377, filed on Aug. 20, 2010.

(51) Int. Cl.
*B64C 9/00* (2006.01)
*B64C 3/10* (2006.01)

(52) U.S. Cl.
USPC .................................. 244/215; 244/35 R

(58) Field of Classification Search
USPC ....... 244/211–217, 88–90 B, 99.14, 35 R, 55, 244/57, 12.6, 1 N
See application file for complete search history.

(56) References Cited

U.S. PATENT DOCUMENTS

| 2,074,201 | A | * | 3/1937 | Bechereau | 244/35 R |
| 3,539,133 | A | * | 11/1970 | Robertson et al. | 244/90 R |
| 5,088,665 | A | * | 2/1992 | Vijgen et al. | 244/215 |
| 5,244,167 | A | * | 9/1993 | Turk et al. | 244/12.1 |
| 6,131,855 | A | * | 10/2000 | Porte | 244/53 B |
| 6,820,410 | B2 | | 11/2004 | Lair | |
| 2008/0272228 | A1 | | 11/2008 | Mengle et al. | |
| 2010/0257865 | A1 | | 10/2010 | Mengle | |
| 2011/0155862 | A1 | | 6/2011 | Mengle | |

OTHER PUBLICATIONS

Steven J. Massey, Alaa A. Elmiligui, Craig A. Hunter, Russell H. Thomas, S. Paul Pao, and Vinod G. Mengle, "Computational Analysis of a Chevron Nozzle Uniquely Tailored for Propulsion Airframe Aeroacoustics," 12th AIAA/CEAS Aeroacuoustics Conference (27th AIAA Aeroacoustics Conference) May 8-10, 2006, Cambridge, Massachusetts.

Craig A. Hunter, Russell H. Thomas, K.S. Abdol-Hamid, S. Paul Pao, Alaa A. Elmiligui, and Steven J. Massey, "Computational Analysis of the Flow and Acoustic Effects of Jet-Pylon Interaction," 11th AIAA/CEAS Aeroacoustics Conference May 23-25, 2005, Monterey, California.

* cited by examiner

*Primary Examiner* — Tien Dinh
*Assistant Examiner* — Richard R Green
(74) *Attorney, Agent, or Firm* — Robin W. Edwards

(57) ABSTRACT

An aircraft system includes a wing and a trailing edge device coupled to the wing. The trailing edge device is movable relative to the wing, and includes a leading edge and a trailing edge having a center flap portion and a plurality of outer edge portions integrally combined with the center flap portion such that the center flap portion is shorter in width than that of outer edge portions.

10 Claims, 4 Drawing Sheets

BLENDED CUTOUT FLAP FOR REDUCTION OF JET-FLAP INTERACTION NOISE

CROSS-REFERENCE TO RELATED APPLICATIONS

This application claims the benefit of priority under 35 U.S.C. §119 of U.S. Provisional Patent Application No. 61/375,377, with a filing date of Aug. 20, 2010, the contents of which are incorporated by reference in their entirety. In addition, this application is co-pending with related patent applications entitled "AIRCRAFT ENGINE EXHAUST NOZZLE SYSTEM FOR JET NOISE REDUCTION" having Ser. No. 13/214,469 and "ACTIVE AIRCRAFT PYLON NOISE CONTROL SYSTEM" having Ser. No. 13/214,481 filed on the same day and owned by the same assignee as this patent application.

ORIGIN OF THE INVENTION

The present invention was made in part by an employee of the United States Government and may be manufactured and used by or for the Government of the United States of America for governmental purposes without the payment of any royalties thereon or therefore.

BACKGROUND OF THE INVENTION

The present invention relates to a trailing edge device of an aircraft wing, and more specifically, a blended cutout flap of a trailing edge device that reduces jet-flap interaction noise.

An aircraft wing typically includes a high-lift system with flaps, which are disposed in an extended position during specific operations of the aircraft. The aircraft wing also includes some elements of a flight control system of the aircraft. FIGS. 1 and 2 are partial schematic diagrams illustrating conventional aircraft wings. As shown in FIG. 1, a portion of an aircraft 50 having a fuselage 51 and a wing 100 with high-lift devices are provided. The high lift devices may include deployable slats 101 positioned toward a leading edge of the) wing 100 and multiple trailing edge devices positioned toward a trailing edge of the wing 100. The trailing, edge devices include an outboard aileron 103, an outboard flap 105, an inboard aileron 107, and an inboard flap 109. The outboard and inboard ailerons 103 and 107 are typically used for roll control of the aircraft 50 while the outboard and inboard flaps 105 and 109 are used to control the lift of the aircraft 50 during takeoff and landing operations. The ailerons 103 and 107 are hinged devices that are un-gapped when in their deployed position. When the flaps 105 and 109 are deployed, they rotate and move in an aft direction to open a gap relative to the wing 100 (as depicted by arrows 111 and 113). Since the motion path of the inboard flap 109 (as indicated by arrow 111) converges with the motion path of the outboard flap 105, the inboard aileron 107 located between the flaps 105 and 109 does not move aft when deployed (as indicated by arrow 115).

As shown in FIG. 2, a portion of an aircraft 50 having a fuselage 51 and a wing 200 with high-lift devices are provided. The high lift devices may include deployable slats 201 positioned toward a leading edge of the wing 200 and multiple trailing edge devices. The trailing edge devices include an outboard aileron 203, an outboard flap 205, a flaperon 207, and an inboard flap 209. The inboard flap 209 and the outboard flap 205 rotate, and the inboard flap 209 travels aft (as depicted by arrow 211), while the outboard flap 205 moves along a motion path as depicted by arrow 213. The flaperon 207 may also move aft to a gapped position as depicted by arrow 215 which is parallel to the movement of the outboard and inboard flaps 205 and 209. Inboard and outboard spoilers 60 and 61 may also be used to control the size of the gaps between the wings and the flaps 205 and 209. The flaperon 207 may be deflected for roll control and lift control.

The engine (not shown) of the aircraft 50 is typically integrated close to the wing 100, 200 and many factors such as weight and ground clearance may cause the wing 100, 200 to become in close proximity to an exhaust flow of the engine. During operation of the high-lift system, as flight control surfaces are deployed, the proximity to the exhaust flow of the engine and the wing's 100, 200 control surfaces is increased. The proximity of the engine to a trailing edge device (e.g., the flaps 109, 209, aileron 107, or flaperon 207) may produce unwanted jet-flap interaction noise that is associated with lower frequencies and radiates strongly when the aircraft 50 is moving in the forward direction. As shown in FIGS. 1 and 2, the trailing edge device e.g., the aileron 107 and the flaperon 207) are typically formed in a trapezoidal shape including a straight trailing edge 107a, 207a which may contribute to the jet-flap interaction noise. A conventional method of decreasing jet-flap interaction noise has been to simply increase the separation between the jet exhaust and the wing (and deflected trailing edge devices). This increased separation results in a longer pylon, longer landing gear (to maintain ground clearance), and, in general, results in increased weight for the aircraft and other undesirable performance parameters. For the majority of aircraft applications, a closer integration of engine and wing will be more desirable if the jet-flap interaction noise can also be minimized.

SUMMARY OF THE INVENTION

According to one embodiment of the present invention, an aircraft system is provided. The aircraft system includes a wing and a trailing edge device coupled to the wing. The trailing edge device is movable relative to the wing, and includes a leading edge and a trailing edge having a center flap portion and a plurality of outer edge portions integrally combined with the center flap portion such that the center flap portion is shorter in width than that of outer edge portions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter, which is regarded as the invention, is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

The present invention is an aircraft trailing edge device that may be implemented with an existing aircraft system. Details of the invention are described in FIGS. 3A through 4B. One skilled in the art however will understand that the present invention may have additional embodiments and that the other embodiments of the invention may be practiced without several of the specific features described below.

Figure 1:
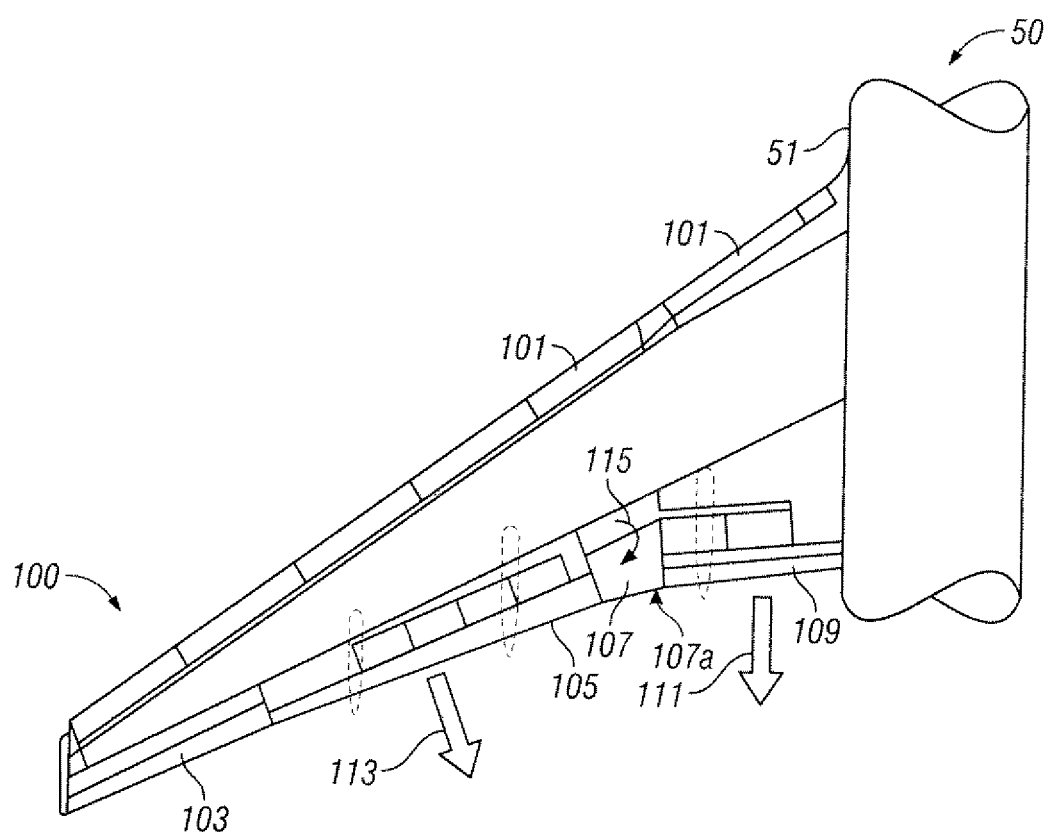
FIG. 1 is a partial schematic diagram illustrating a conventional aircraft wing.
Figure 2:
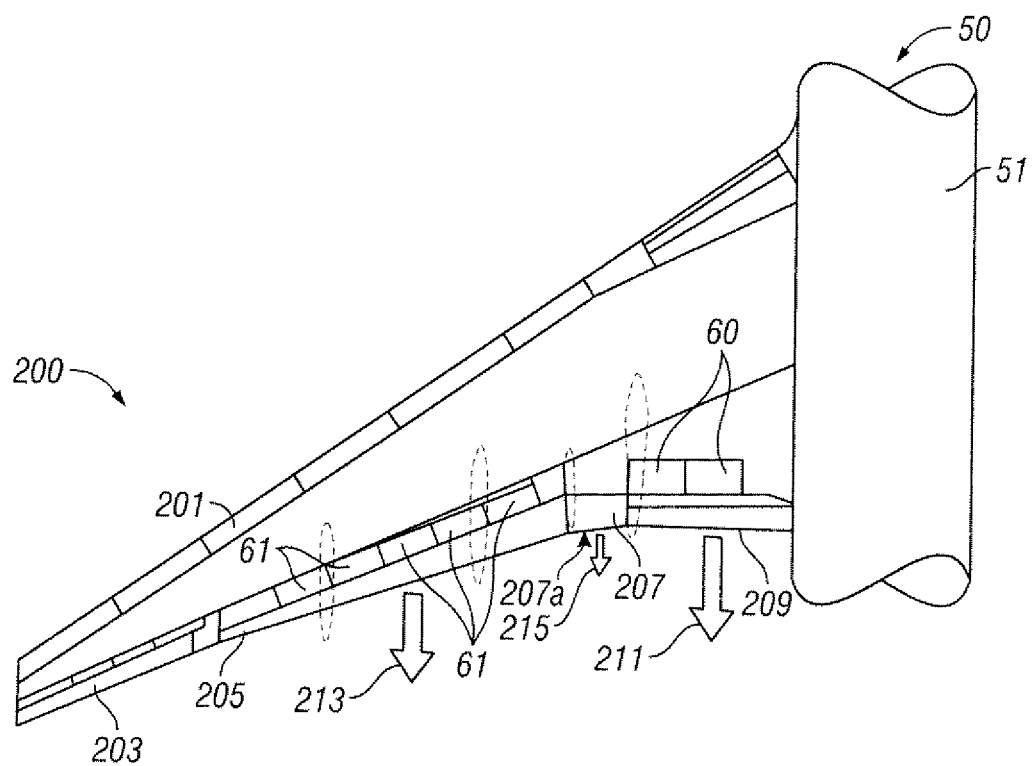
FIG. 2 is a partial schematic diagram illustrating another conventional aircraft wing.
Figure 3A:
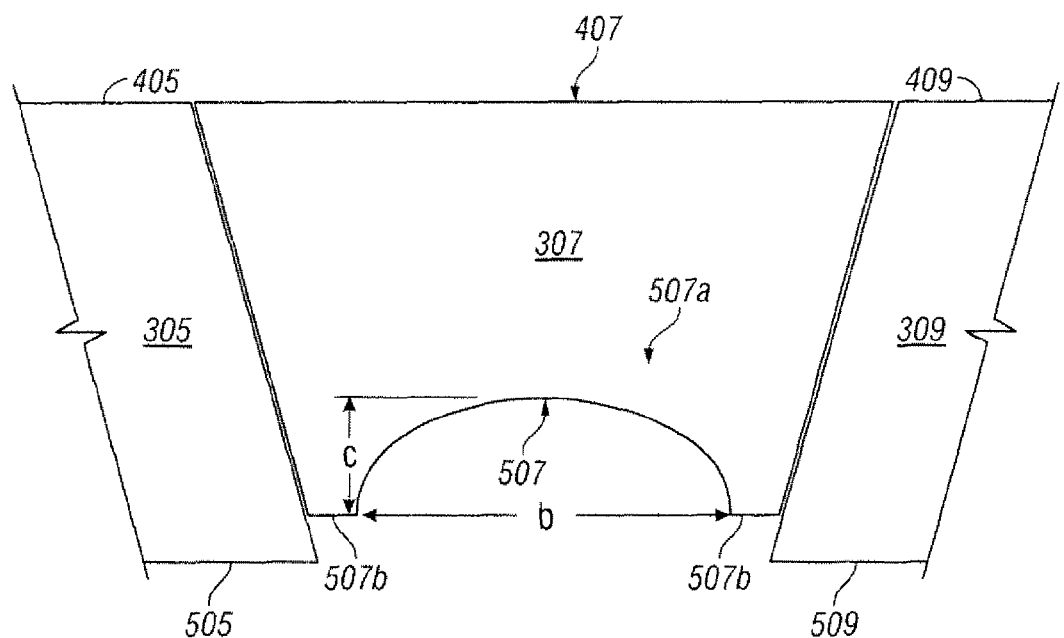
FIG. 3A is a schematic diagram of a trailing edge device of an aircraft wing that can be implemented within embodiments of the present invention.
Figure 3B:
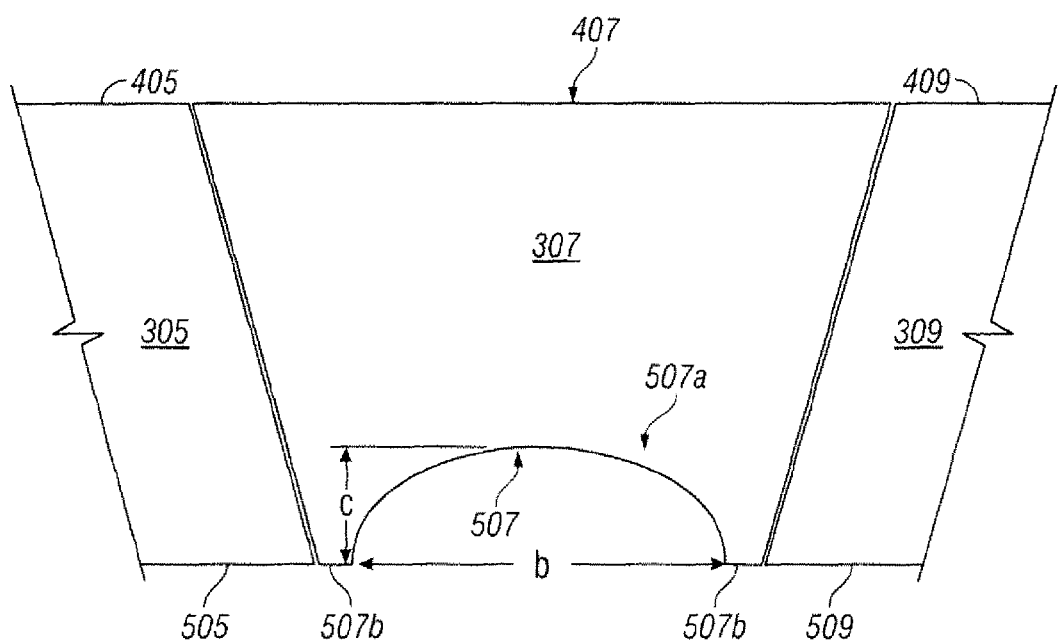
FIG. 3B is a schematic diagram of a trailing edge device of an aircraft wing that can be implemented within alternative embodiments of the present invention.

With reference now to FIGS. 3A and 3B, as shown, trailing edge devices coupled to an aircraft wing (such as 100, 200 as depicted in FIGS. 1 and 2) are provided. The trailing edge devices comprise an outboard trailing edge device 305, an intermediate trailing edge device 307 and an inboard trailing edge device 309 disposed adjacent to a fuselage (element 51 as depicted in FIG. 1, for example). The intermediate trailing edge device 307 is disposed between the outboard trailing edge device 305 and the inboard trailing edge device 309 and is within close proximity to engine exhaust flow of the aircraft system. According to an embodiment of the present invention, the outboard trailing edge device 305 may be an outboard flap and the inboard trailing device 309 may be an inboard flap.

Further, according to an embodiment of the present invention, the intermediate trailing edge device 307 may be a flaperon or an aileron. The outboard trailing edge device 305 and the inboard trailing edge device 309 are similar to the outboard and inboard flaps 105, 109, 205 and 209 shown in FIGS. 1 and 2 respectively, therefore a detailed description thereof is omitted.

Each of the trailing edge devices 305, 307, and 309 comprises a leading edge surface 405, 407, 409, and a trailing edge surface 505, 507, and 509, respectively. The aircraft (not shown) is controlled by activating the trailing edge devices 305, 307 and 309 under the direction of a control system (not shown) and are movable relative to the wing (100, 200 as depicted in FIGS. 1 and 2).

The leading edge surfaces 405, 407 and 409 may be formed with a straight surface in a spanwise direction. The trailing edge surface 507 of the intermediate trailing edge device 307 may be formed in a different manner than that of the trailing edge surfaces 505 and 509 of the outboard trailing edge device 305 and the inboard trailing edge device 309, respectively in a spanwise direction.

According to an embodiment of the present invention, the intermediate trailing edge surface 507 of the intermediate trailing edge device 307 includes a center flap portion 507a and a plurality of outer edge portions 507b integrally combined with a center flap portion 507a. According to an embodiment of the present invention, the center flap portion 507a is shorter in width than that of outer edge portions 507b. According to another embodiment of the present invention, the center flap portion 507a is formed of a concave surface (i.e., a cutout surface). The concave surface may be formed of an elliptical shape as shown in FIGS. 3A and 3B. The shape of the center flap 507a reduces the chord of the trailing edge device 307 while retaining as much area of the trailing edge device 307 toward the edges as possible, and blends the edges of the trailing edge device 307 with the adjacent trailing edge devices 305 and 309.

According to an embodiment of the present invention, the center flap portion 507a may be characterized by dimensions (i.e., ratio of length/width) "b/c" (as depicted in FIG. 3A, for example) where b/c equals approximately 3.5, for example. The present invention is not limited hereto, and may vary accordingly.

The outer edge portions 507b may each be formed of an L-shaped surface as shown in FIGS. 3A and 3B. A length of the outer edge portions 507b is determined by balancing a maximum length of the center flap portion 507a ("b") while having sufficient structural strength to the outer edge portions 507b of the trailing edge device 307.

According to one embodiment of the present invention, as shown in FIG. 3A, the outer edge portions 507b are shorter in width than that of an adjacent trailing edge device (i.e., the outboard trailing edge device 305 or the inboard trailing edge device 309).

According to alternative embodiments of the present invention, as shown in FIG. 3B, the outer edge portions 507b may be formed of a same width as that of the adjacent trailing edge devices 305 and 309.

Figure 4A:
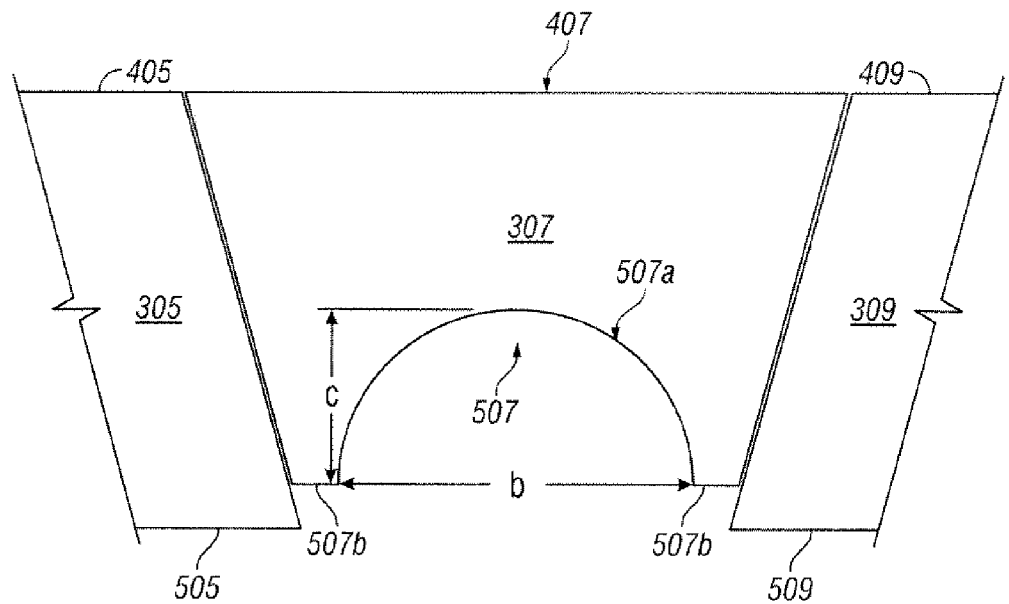
FIG. 4A is a schematic diagram of a trailing edge device of an aircraft wing that can be implemented within alternative embodiments of the present invention.
Figure 4B:
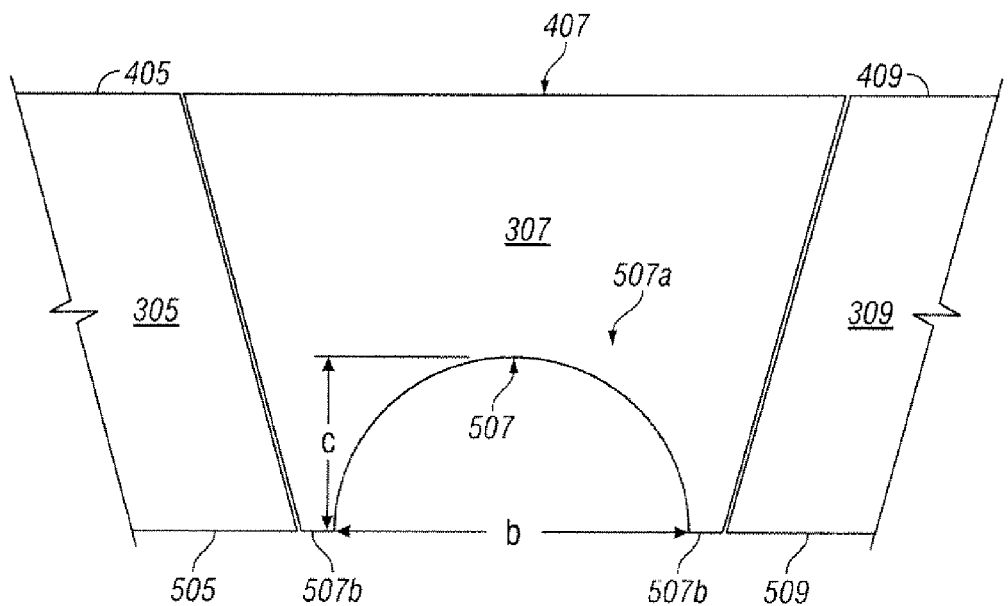
FIG. 4B is a schematic diagram of a trailing edge device of an aircraft wing that can be implemented within alternative embodiments of the present invention.

The present invention is not limited to the center portion 507a being of a particular shape, and may vary accordingly. FIGS. 4A and 4B are schematic diagrams of a trailing edge device of an aircraft wing that can be implemented within alternative embodiments of the present invention.

As shown in FIGS. 4A and 4B, the trailing edge device includes the same features as that of the trailing edge devices shown in FIGS. 3A and 3B therefore a detailed description of these features has been omitted. The center flap portion 507a shown in FIGS. 4A and 4B are different in shape than that of the trailing edge devices shown in FIGS. 3A and 3B. Specifically, the center flap portion 507a in FIGS. 4A and 4B is formed of a semicircular shape.

According to another embodiment of the present invention, the features of the trailing edge device 307 may be incorporated into the other trailing edge devices 305 and 309, for example.

Embodiments of the present invention provide a trailing edge device that includes a center flap portion and outer edge portions, where the center flap portion is shorter in length in comparison to outer edge portions. In addition, the center flap portion is curved in the planform of the trailing edge device. The present invention therefore provides the advantages of reducing jet-flap interaction noise while preserving the aerodynamic load capacity of the trailing edge device.

The terminology used herein is for the purpose of describing particular embodiments only and is not intended to be limiting of the invention. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment were chosen and described in order to best explain the principles of the invention and the practical application, and to enable others of ordinary skill in the art to understand the invention for various embodiments with various modifications as are suited to the particular use contemplated. It is therefore to be understood that, within the scope of the appended claims, the invention may be practiced other than as specifically described.

What is claimed as new and desired to be secured by Letters Patent of the United States is:

1. An aircraft system comprising:
   a wing; and
   a trailing edge device coupled to the wing, wherein the trailing edge device is movable relative to the wing and comprises a leading edge and a trailing edge, and wherein the trailing edge has a cutout such that it comprises a center flap portion and a plurality of outer edge portions integrally combined with the center flap portion wherein the center flap portion is shorter in chordwise width than that of the outer edge portions, and further wherein the center flap portion and outer edge portions do not extend beyond the trailing edge of the wing.

2. The aircraft system of claim 1, wherein the center flap portion comprises a concave surface.

3. The aircraft system of claim 2, wherein the concave surface is of an elliptical shape.

4. The aircraft system of claim 2, wherein the concave surface is of a semicircular shape.

5. The aircraft system of claim 2, wherein the outer edge portions each comprise an L-shaped surface.

6. The aircraft system of claim 2, wherein the outer edge portions are shorter in width than that of an adjacent trailing edge device.

7. The aircraft system of claim 2, wherein the outer edge portions are of a same width as that of an adjacent trailing edge device.

8. The aircraft system of claim 1, wherein the trailing edge device is a flaperon.

9. The aircraft system of claim 1, wherein the trailing edge device is an aileron.

10. The aircraft system of claim 1, wherein the trailing edge device is an outboard flap or inboard flap.

* * * * *